US008390426B2

(12) United States Patent
Farneti

(10) Patent No.: US 8,390,426 B2
(45) Date of Patent: Mar. 5, 2013

(54) APPARATUS FOR REMOTE OPENING OF DOORS OR GATES OF A BUILDING

(75) Inventor: Aldo Farneti, Milan (IT)

(73) Assignee: Business Gates S.p.A., Milan (IT)

( * ) Notice: Subject to any disclaimer, the term of this patent is extended or adjusted under 35 U.S.C. 154(b) by 260 days.

(21) Appl. No.: 12/452,406

(22) PCT Filed: Jun. 18, 2008

(86) PCT No.: PCT/EP2008/057676

§ 371 (c)(1), (2), (4) Date: Dec. 29, 2009

(87) PCT Pub. No.: WO2009/003841

PCT Pub. Date: Jan. 8, 2009

(65) Prior Publication Data

US 2010/0134316 A1 Jun. 3, 2010

(30) Foreign Application Priority Data

Jun. 29, 2007 (IT) .............................. MI2007A1301

(51) Int. Cl.
*G05B 19/00* (2006.01)

(52) U.S. Cl. ........... 340/5.1; 340/5.2; 340/5.61; 340/5.7

(58) Field of Classification Search ................... 340/5.1, 340/5.3; 379/88.19, 207.15, 102.01, 102.06
See application file for complete search history.

(56) References Cited

U.S. PATENT DOCUMENTS

| | | | | |
|---|---|---|---|---|
| 5,517,185 | A * | 5/1996 | Acimovic et al. | 340/5.33 |
| 5,629,981 | A * | 5/1997 | Nerlikar | 713/168 |
| 5,936,544 | A * | 8/1999 | Gonzales et al. | 340/5.22 |
| 6,720,861 | B1 * | 4/2004 | Rodenbeck et al. | 340/5.64 |
| 6,963,277 | B2 * | 11/2005 | Imasaki et al. | 340/539.1 |
| 6,999,825 | B2 * | 2/2006 | Inomata | 700/90 |
| 7,012,503 | B2 * | 3/2006 | Nielsen | 340/5.6 |
| 7,065,196 | B2 * | 6/2006 | Lee | 379/167.07 |
| 7,075,451 | B2 * | 7/2006 | Yamada | 705/5 |

(Continued)

FOREIGN PATENT DOCUMENTS

| | | |
|---|---|---|
| GB | 2 417 858 | 3/2006 |
| WO | WO 03/023722 | 3/2003 |

OTHER PUBLICATIONS

International Search Report dated Oct. 9, 2008.

*Primary Examiner* — Jennifer Mehmood
*Assistant Examiner* — Rufus Point
(74) *Attorney, Agent, or Firm* — Jacobson Holman PLLC

(57) ABSTRACT

There is disclosed an apparatus for remote opening of doors or gates of at least a building (A, A1 . . . An). The apparatus comprises a unit (B, B 1 . . . Bn) located in the building (A, A1 . . . An) and accessible from a plurality of external terminals (C1 . . . Cn) provided with a GSM module; the unit (B, B1 . . . Bn) is connected to electromechanical means (50) suitable for opening and closing said doors or gates and comprises a database (2) containing the list of the telephone numbers of said plurality of external terminals (C1 . . . Cn), a GSM interface (3) for connecting to the external terminals (C1 . . . Cn) and means (4) for managing said interface (3) and said database (2). The managing means (4) is interrogatable by the external terminals (C1 . . . Cn) and is suitable for commanding the electromechanical means (50) for opening gates or doors if the telephone number of the interrogating external terminal is on the list of telephone numbers of the external terminals (C1 . . . Cn) of the database.

6 Claims, 2 Drawing Sheets

U.S. PATENT DOCUMENTS 7,295,119 B2 * 11/2007 Rappaport et al. ......... 340/572.4
7,304,572 B2 * 12/2007 Sheynman et al. ...... 340/539.14
7,321,288 B2 * 1/2008 Nishimura ..................... 340/5.2
7,468,676 B2 * 12/2008 Styers et al. ............... 340/686.1
7,515,063 B2 * 4/2009 Brundula ..................... 340/6.11
7,606,558 B2 * 10/2009 Despain et al. ............... 455/410
7,900,253 B2 * 3/2011 Wendling et al. ............... 726/20
7,936,736 B2 * 5/2011 Proctor et al. ................ 370/338
8,009,013 B1 * 8/2011 Hirschfeld et al. ............ 340/5.2
8,063,734 B2 * 11/2011 Conforti ...................... 340/5.61
2004/0017929 A1 * 1/2004 Bramblet et al. ............. 382/103
2005/0040951 A1 * 2/2005 Zalewski et al. ........... 340/572.1
2005/0099262 A1 * 5/2005 Childress et al. .............. 340/5.6
2005/0174258 A1 * 8/2005 Yamanouchi et al. ........ 340/928
2005/0190900 A1 * 9/2005 White et al. ............. 379/102.06
2005/0241003 A1 * 10/2005 Sweeney et al. ................ 726/28
2007/0186106 A1 * 8/2007 Ting et al. ...................... 713/168
2008/0106370 A1 * 5/2008 Perez et al. .................... 340/5.7
2009/0206985 A1 * 8/2009 Hsia et al. ...................... 340/5.7
2010/0075656 A1 * 3/2010 Howarter et al. ............. 455/420

* cited by examiner

APPARATUS FOR REMOTE OPENING OF DOORS OR GATES OF A BUILDING

This is a national stage of PCT/EP08/057,676 filed Jun. 18, 2008 and published in English, which has a priority of Italian no. MI2007A 001301 filed Jun. 29, 2007, hereby incorporated by reference.

The present invention relates to an apparatus for remote opening of doors or gates of a building.

Currently, buildings provided with doors or gates, such as condominiums, are provided with key closures or closures by electronic means that are remote-controlled by remote controls for opening doors or gates to access the building and, in particular, sectors of the building such as garages or storage facilities.

It is also possible for the doors and gates of the building to be provided with an electromechanical device that is remote-controlled by remote controls for opening doors or gates.

In view of this prior art, the object of the present invention is to provide an apparatus for the remote opening of doors or gates of buildings that is different from known apparatuses.

According to the present invention, said object is obtained by means of an apparatus for remote opening of doors or gates of at least a building, characterised in that it comprises a unit located in the building and accessible from a plurality of external terminals provided with a GSM module, said unit being connected to electromechanical means suitable for opening and closing said doors or gates, said unit comprising a database containing the list of the telephone numbers of said plurality of external terminals, a GSM interface for connecting to the external terminals and means for managing said interface and said database, said managing means being interrogatable by said external terminals and being suitable for commanding said electromechanical means for opening gates or doors if the telephone number of the interrogating external terminal is on the list of telephone numbers of the external terminals of the database.

The features of the present invention will be clearer from the following description of a practical embodiment thereof illustrated by way of non-limiting limiting example in the attached drawings, in which.

Figure 1:
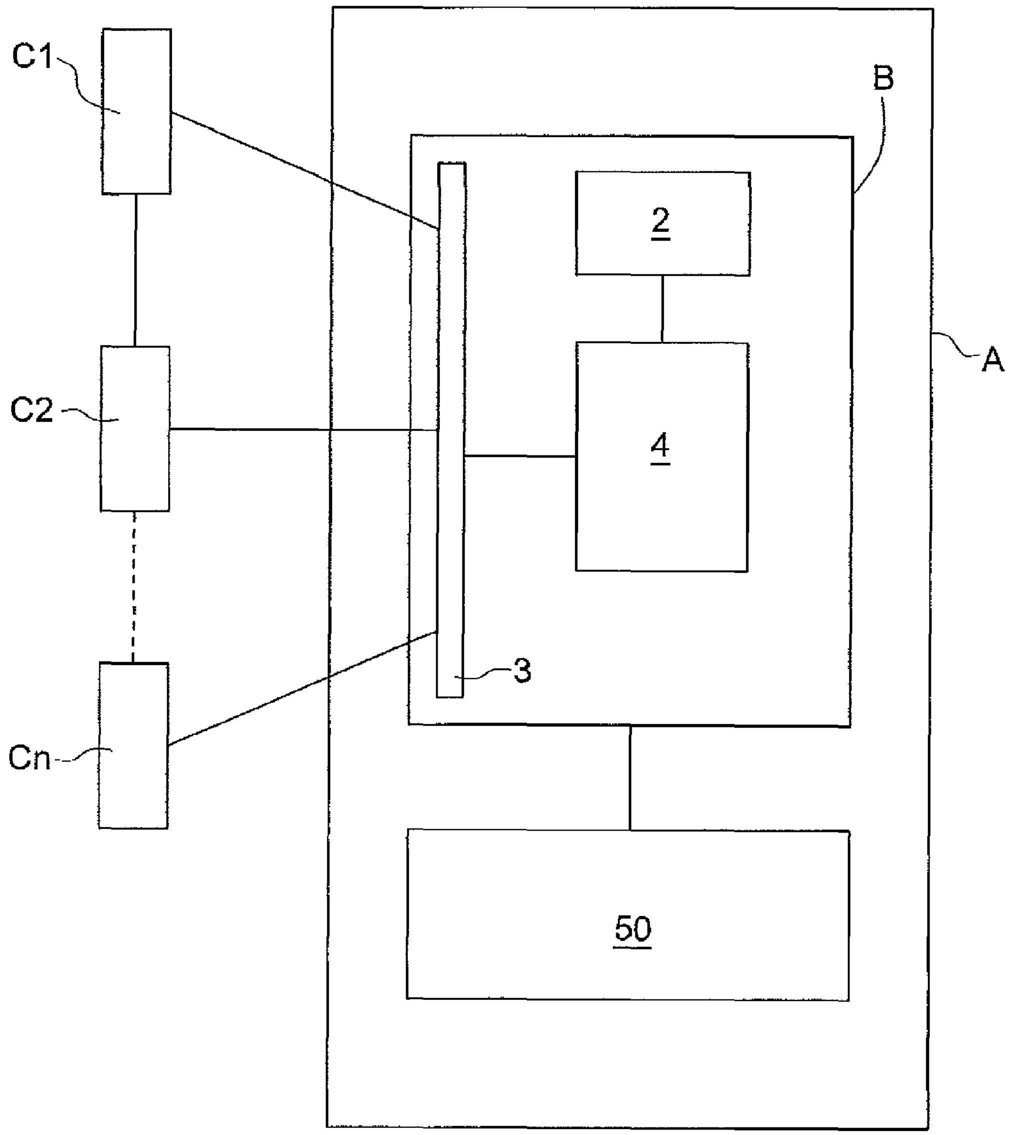
FIG. 1 is a diagram of an apparatus for remote opening of doors or gates of buildings according to an embodiment of the present invention.
Figure 2:
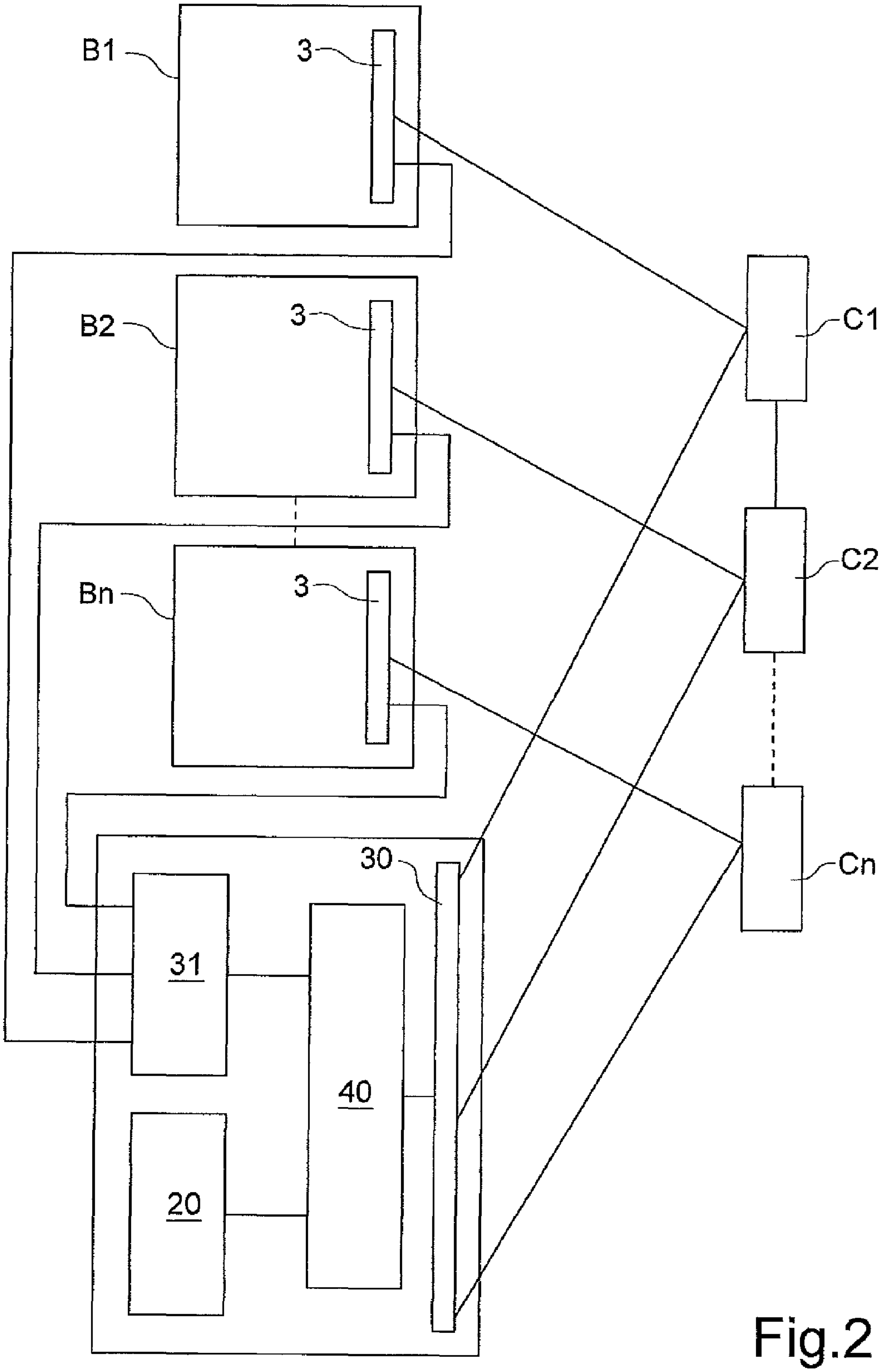
FIG. 2 is a diagram of the apparatus according to a variant of the embodiment of the present invention.

With reference to FIG. 1 there is shown a diagram of an apparatus for remote opening of doors or gates of buildings according to the present invention. Said apparatus comprises at least a unit B, arranged in a building A and connected to electromechanical means 50 for opening doors or gates.

The apparatus comprises a plurality of external terminals C1 . . . Cn provided with a GSM module. The unit B comprises a memory with a database 2 containing the list of the telephone numbers of said plurality of external terminals C1 . . . Cn, a GSM interface 3 for connecting to the external remote terminals C1 . . . Cn and means 4 for managing said interface 3 and the database 2. The managing means 4 is interrogatable by the external terminals C1 . . . Cn and is suitable for commanding the electromechanical means for opening gates or doors if the telephone number of the interrogating external terminal is on the list of telephone numbers of the external terminals C1 . . . Cn of the database. The managing means 4 comprises a data-processing system and a memory on which an application software is installed and run that enables the telephone number of the calling terminal C1 . . . Cn to be received by the interface 3 without replying to the telephone call, that enables it to be checked whether the telephone number of the calling external terminal is on the list of telephone numbers stored in the database 2 and subsequently enables a door or gate opening command to be sent to the means 50 if the check operation has a positive outcome. Preferably, the external terminals consist of mobile phone terminals.

According to a variant of the embodiment of the present invention the apparatus comprises a central unit 1 consisting of a data-processing system and a memory and on which an application software is installed and run. The apparatus preferably comprises a plurality of units B1 . . . Bn located in the buildings A1 . . . An. The memory of the central unit 1 comprises a database 20 containing a list of the peripheral units B1 . . . Bn and the list of activating passwords or codes associated with said units B1 . . . Bn located in the buildings A1 . . . An and suitable for activating said units.

The central unit 1 comprises a GSM interface 30 for remote connection to the external terminals C1 . . . Cn. The central unit 1 comprises an interface 31 for remote connection to said units B1 . . . Bn located in the buildings A1 . . . An and means 40 for managing the interfaces 30 and 31 and the database 20. The managing means 40 comprises a data-processing system and a memory on which an application software is installed and run, it is interrogatable by the external terminals C1 . . . Cn by means of sending of password and is suitable for checking whether the sent password is on the list of the passwords of the database. If the checking operation is positive the managing means 40 is suitable for storing the telephone number of the interrogating external remote terminal and for sending data to the unit B1 . . . Bn located in the building A1 . . . An to which the password corresponds; said data contain the telephone number of the interrogating external remote terminal and the validity period of the door or gates opening service.

Interrogating the managing means 40 is achieved by a written text message SMS containing the password and the data sent from the central unit 1 to the units B1 . . . Bn are sent by a written text message SMS.

The external remote terminals C1 . . . Cn are normally mobile phones of the various users.

The interface 30 is able to receive the text messages from the terminals C1 . . . Cn and to send the text messages to the means 40.

The interface 31 is suitable for sending text messages coming from the means 40 to the unit B1 . . . Bn designated by the password.

The application software relating to the central unit 1 comprises various modules with which the following functions are combined:

- authentication of the requests by checking that the received password is on the list of the passwords that is stored in the database 20;
- association of the sent password with the corresponding unit B1 . . . Bn and storing the telephone number of the interrogating external terminal;
- sending of the messages to the unit B1 . . . Bn designated with the telephone number of the interrogating external terminal and of the duration of the service.

The operation of the apparatus is as follows.

Each remote terminal C1 . . . Cn sends a text message containing a password to the central unit 1. The software of the unit 1, by means of the authentication function, checks whether the password is one of the passwords contained on the list of the database, stores the telephone number of the interrogating terminal sends a text message SMS or makes a GPRS call containing said telephone number and the duration of the service to the unit B1 . . . Bn corresponding to the password. In this manner the user who is the possessor of the terminal is enabled for opening the door or gate of the building in which the unit B1 . . . Bn is located. The telephone number will therefore need only to be keyed in to open the gate or door.

Normally, the text message SMS sent from the unit 1 to the designated unit B1 . . . Bn is of encrypted or encoded type.

Preferably, the central unit 1 interacts with all the units B1 . . . Bn, enabling the data of the units B1 . . . Bn to be updated. Further, the units B1 . . . Bn interact with the central unit 1 by means of text messages or GPRS calls to send data on the openings of the doors or gates connected to the unit B1 . . . Bn to the central unit 1 that stores said data in the memory.

Both the units B1 . . . Bn and the central unit 1 have a telephone number; the central unit 1 can have more than one telephone number.

The invention claimed is:

1. A apparatus for remote opening of doors or gates of at least a building, said apparatus comprising a plurality of units located in the building and accessible from a plurality of external terminals provided with a GSM module, each of said units being connected to electromechanical means suitable for opening and closing said doors or gates, each of said units comprising a database containing a list of the telephone numbers of said plurality of external terminals, a GSM interface for connecting to the external terminals and means for managing said interface and said database, said managing means being interrogatable by said external terminals and being suitable for commanding said electromechanical means for opening gates or doors if the telephone number of the interrogating external terminal is on the list of telephone numbers of the external terminals of the database; and said apparatus further comprising a central unit comprising a memory provided with a database containing a list of said units located in the building and a list of passwords associated with said units located in the building and suitable for activating said units, an interface for remote connection to said units located in the building, a GSM interface for connecting to the external terminals and means for managing said interfaces and said database, said managing means being interrogatable by said external terminals by means of sending a password and being suitable for checking whether the sent password is on the list of passwords of the database and, if the checking operation has been positive, being suitable for storing the telephone number of the interrogating external terminal and for sending data to said units located in the building, said data containing the telephone number of the interrogating external terminal and the validity period of the door or gates opening service.

2. The apparatus according to claim 1, characterised in that said managing means of said units comprises data-processing means for processing data and application software for managing said processing means, said application software comprising the following functions: receiving the telephone number of the calling external terminal via the interface without replying to the telephone call, checking whether the telephone number of the calling external terminal is on the list of telephone numbers stored in the database and the subsequent operation of sending a gate or door-opening command to the electromechanical means if the check operation has had a positive outcome.

3. The apparatus according to claim 1, characterised in that said external terminals are mobile phone terminals.

4. The apparatus according to claim 1, characterised in that said managing means of the central unit comprises data-processing means for processing data and application software for managing said processing means, said application software comprising the following functions: authentication of the requests by checking that the received password is on the list of the passwords stored in the database, association of the sent password with the corresponding unit and storing the telephone number of the interrogating external terminal, sending of the messages to the designated unit with telephone number of the interrogating external terminal and of the duration of the service.

5. The apparatus according to claim 1, characterised in that said central unit is suitable for sending information by a text message to the designated unit located in the building.

6. The apparatus according to claim 1, characterised in that said central unit is suitable for sending information by a GPRS call to the designated unit located in the building.

* * * * *